US012370634B2

(12) United States Patent
Schahuber

(10) Patent No.: US 12,370,634 B2
(45) Date of Patent: Jul. 29, 2025

(54) TANK FABRICATING EQUIPMENT

(71) Applicant: Amprod LLC, Strafford, MO (US)

(72) Inventor: William A. Schahuber, Springfield, MO (US)

(73) Assignee: AMPROD LLC, Strafford, MO (US)

( * ) Notice: Subject to any disclaimer, the term of this patent is extended or adjusted under 35 U.S.C. 154(b) by 0 days.

(21) Appl. No.: 18/109,172

(22) Filed: Feb. 13, 2023

(65) Prior Publication Data

US 2023/0234174 A1 Jul. 27, 2023

Related U.S. Application Data

(63) Continuation of application No. 16/275,922, filed on Feb. 14, 2019, now Pat. No. 11,577,348.

(60) Provisional application No. 62/698,627, filed on Jul. 16, 2018.

(51) Int. Cl.
*B23K 37/053* (2025.01)
*B23K 9/028* (2006.01)
*B23K 37/0533* (2025.01)
*B23K 101/12* (2006.01)

(52) U.S. Cl.
CPC ........ *B23K 37/0533* (2013.01); *B23K 9/0282* (2013.01); *B23K 2101/12* (2018.08)

(58) Field of Classification Search
CPC ............. B23K 2101/12; B23K 9/0282; B23K 37/0533
USPC ..................................................... 219/137 R
See application file for complete search history.

(56) References Cited

U.S. PATENT DOCUMENTS

| 1,378,253 | A |   | 5/1921  | McConnell et al. |
| 1,415,530 | A | * | 5/1922  | Davis ....................... B23Q 7/02 409/165 |
| 1,679,499 | A |   | 8/1928  | Rupley |
| 1,740,033 | A | * | 12/1929 | Pinckney .................. B23K 9/02 228/32 |
| 1,907,702 | A | * | 5/1933  | Anderson ................ B23K 5/08 228/244 |
| 1,972,029 | A | * | 8/1934  | Norquist ............... B23K 9/0284 219/60 R |
| 1,992,812 | A | * | 2/1935  | Chapman ........... B23K 37/0538 414/433 |

(Continued)

FOREIGN PATENT DOCUMENTS

WO   WO-2015132545 A1 * 9/2015   ......... B23K 37/0533

OTHER PUBLICATIONS

"Corrected Notice of Allowability Received for U.S. Appl. No. 16/275,922, mailed on Jan. 19, 2023."

(Continued)

*Primary Examiner* — Jimmy Chou
(74) *Attorney, Agent, or Firm* — Kutak Rock LLP; Ryan S. Hinderliter

(57) ABSTRACT

A design for tank fabricating equipment and system comprises a frame supporting opposing arms for supporting one or more tank shells. The opposing arms pivotally engage opposing sides of the tank shells to force them into a circular cross-sectional shape. The arms are provided with rollers for aligning the tank shell with adjacent components during fabrication. In some embodiments, the rollers are provided with a circumferential channel to accommodate welding seams and to ensure alignment of butt joints.

19 Claims, 12 Drawing Sheets

(56) References Cited

U.S. PATENT DOCUMENTS

| | | | | |
|---|---|---|---|---|
| 2,270,766 A | * | 1/1942 | Pierce | B23K 37/0533 269/235 |
| 2,701,648 A | * | 2/1955 | McBath | B23K 37/0538 414/433 |
| 2,753,826 A | * | 7/1956 | Dougherty | B23K 9/0282 228/6.1 |
| 2,758,367 A | * | 8/1956 | Dougherty | B65D 88/08 228/5.1 |
| 2,811,874 A | * | 11/1957 | Rethoret | B23K 63/003 451/236 |
| 2,944,449 A | * | 7/1960 | Wheeler | B23K 5/006 228/6.1 |
| 3,225,631 A | * | 12/1965 | Hermann | B23Q 1/76 82/164 |
| 3,239,209 A | * | 3/1966 | Kucka | B23K 37/053 269/37 |
| 3,255,336 A | | 6/1966 | Purcell | |
| 3,258,144 A | * | 6/1966 | Reschke | B23K 37/0538 414/433 |
| 3,302,285 A | * | 2/1967 | Mann, Jr. | B23D 21/00 30/92 |
| 3,320,839 A | * | 5/1967 | Dinsmore | B23Q 1/76 82/132 |
| 3,324,275 A | * | 6/1967 | Peignen | B23K 9/0286 219/60 R |
| 3,422,519 A | * | 1/1969 | Fehlman | B23K 37/0533 228/44.5 |
| 3,430,661 A | * | 3/1969 | Sabine | F16L 23/024 138/144 |
| 3,430,938 A | * | 3/1969 | Blackburn | B23K 7/007 266/57 |
| 3,464,685 A | * | 9/1969 | Schreib | B23K 9/032 266/58 |
| 3,480,158 A | * | 11/1969 | Pandjiris | B23K 37/0538 414/757 |
| 3,520,218 A | * | 7/1970 | Tolkmitt | H01L 21/67126 82/92 |
| 3,527,363 A | * | 9/1970 | Thatcher | B21B 39/30 198/377.02 |
| 3,541,905 A | * | 11/1970 | Mey | B23D 45/124 82/47 |
| 3,572,199 A | * | 3/1971 | Harden | B23D 45/124 82/101 |
| 3,593,402 A | | 7/1971 | Mori | |
| 3,606,033 A | * | 9/1971 | Barilla | B23Q 1/527 414/777 |
| 3,634,648 A | * | 1/1972 | Morris | B23K 9/0282 219/60 A |
| 3,636,294 A | * | 1/1972 | Peyrot | B23K 37/0533 219/60 A |
| 3,734,387 A | * | 5/1973 | Sannipoli | B23K 37/0533 228/6.1 |
| 3,772,753 A | * | 11/1973 | Sargeant | B23K 37/0533 29/721 |
| 3,780,421 A | * | 12/1973 | White, Jr. | F16L 1/26 29/721 |
| 3,783,232 A | * | 1/1974 | Mengeringhausen | B23K 9/028 219/60 R |
| 3,807,260 A | * | 4/1974 | Berdyansky | B23D 21/00 82/101 |
| 3,827,126 A | * | 8/1974 | Shiozawa | B25H 1/00 29/721 |
| 3,850,058 A | * | 11/1974 | Bachmann | B23D 21/00 82/101 |
| 3,913,820 A | * | 10/1975 | Valentine | B23K 9/0282 901/14 |
| 3,918,628 A | * | 11/1975 | Clavey | B23K 9/02 219/60 A |
| 3,918,697 A | * | 11/1975 | Gregory | B23Q 1/76 414/757 |
| 4,009,360 A | | 2/1977 | Beetham | |
| 4,025,034 A | * | 5/1977 | Randolph | B23K 9/035 228/41 |
| 4,039,115 A | * | 8/1977 | Randolph | B23K 37/0538 269/287 |
| 4,052,039 A | * | 10/1977 | Koyano | B23K 7/006 219/60 R |
| 4,081,651 A | * | 3/1978 | Randolph | B23K 11/093 266/61 |
| 4,086,690 A | | 5/1978 | Bernasconi | |
| 4,169,977 A | * | 10/1979 | Pedersen | B66C 17/04 212/319 |
| 4,221,523 A | | 9/1980 | Eberle | |
| 4,284,385 A | | 8/1981 | Lively et al. | |
| 4,288,681 A | * | 9/1981 | Niemann | H02G 5/063 266/58 |
| 4,356,615 A | * | 11/1982 | Dearman | B23K 37/0533 29/234 |
| 4,367,891 A | | 1/1983 | Wauer et al. | |
| 4,412,401 A | * | 11/1983 | Fundell | B23D 45/044 82/86 |
| 4,416,174 A | * | 11/1983 | Owsen | B23Q 1/76 82/162 |
| 4,441,696 A | * | 4/1984 | Buzinski | B21F 3/00 266/62 |
| 4,492,015 A | * | 1/1985 | Dearman | B23K 9/0286 269/43 |
| 4,504,047 A | * | 3/1985 | Jantzen | B23K 9/0284 269/287 |
| 4,517,867 A | * | 5/1985 | Fuminier | B23D 21/00 82/59 |
| 4,540,872 A | * | 9/1985 | Siler | B23K 37/0538 219/60 R |
| 4,546,681 A | * | 10/1985 | Owsen | B23Q 1/76 294/902 |
| 4,570,842 A | * | 2/1986 | Gregorious | B29C 65/7802 269/37 |
| 4,619,026 A | * | 10/1986 | Suzuki | B23K 37/053 29/256 |
| 4,693,149 A | * | 9/1987 | Sireix | B26D 3/16 72/50 |
| 4,754,673 A | * | 7/1988 | Hiestand | B23Q 1/76 82/162 |
| 4,756,217 A | * | 7/1988 | Holmes | B23K 7/006 82/53.1 |
| 5,027,681 A | * | 7/1991 | Hyvarinen | B23D 45/124 409/199 |
| 5,075,527 A | * | 12/1991 | Ikuma | B23K 37/053 219/60 R |
| 5,126,523 A | * | 6/1992 | Rinaldi | B23K 37/0533 219/60 R |
| 5,261,301 A | * | 11/1993 | Babb | B23D 21/00 82/86 |
| 5,347,897 A | * | 9/1994 | Rouleau | B25B 5/147 82/127 |
| 5,500,641 A | * | 3/1996 | Roberts | F16P 3/00 414/757 |
| 5,685,996 A | * | 11/1997 | Ricci | B23K 37/0536 219/60 A |
| 5,697,511 A | | 12/1997 | Bampton | |
| 5,886,314 A | * | 3/1999 | Sims | B23K 10/00 219/61.5 |
| 5,894,772 A | * | 4/1999 | Nodar | B23B 5/162 82/113 |
| 5,934,626 A | * | 8/1999 | Collins, Jr. | B23K 37/0538 269/289 MR |
| 6,039,634 A | * | 3/2000 | Bach | B23Q 1/4857 451/61 |
| 6,070,784 A | | 6/2000 | Holt et al. | |
| 6,101,910 A | * | 8/2000 | Nicolai | B26D 3/164 82/138 |
| 6,212,986 B1 | * | 4/2001 | Decker | F42B 33/06 89/1.13 |
| 6,259,052 B1 | | 7/2001 | Ding et al. | |
| 6,267,037 B1 | * | 7/2001 | McCoy, Jr. | B23D 57/0084 83/810 |

(56) References Cited

U.S. PATENT DOCUMENTS

| | | | |
|---|---|---|---|
| 6,640,677 B2* | 11/2003 | Ueda | B23B 3/06 29/27 C |
| 6,938,313 B2* | 9/2005 | Viola | B23C 3/122 83/54 |
| 7,191,689 B2* | 3/2007 | Clark | B27C 7/06 82/158 |
| 7,597,035 B2* | 10/2009 | Rehm | B23Q 11/10 82/162 |
| 8,056,796 B2* | 11/2011 | Simmons | B23K 37/0443 228/49.1 |
| 8,061,582 B2* | 11/2011 | Cittadini Bellini | F16L 58/181 219/60 A |
| 8,418,589 B1* | 4/2013 | Kaehr | B23D 45/124 83/648 |
| 8,550,326 B2 | 10/2013 | Packer et al. | |
| 8,763,257 B2* | 7/2014 | Thorson | H01M 10/441 173/217 |
| 9,517,508 B2* | 12/2016 | Park | B23B 3/065 |
| 9,533,355 B2* | 1/2017 | Esser | B23B 25/06 |
| 9,623,526 B2* | 4/2017 | Perez | B23B 25/06 |
| 9,682,452 B2* | 6/2017 | Ueda | B23Q 1/763 |
| 9,746,103 B2* | 8/2017 | Laurini | E02F 5/10 |
| 9,937,596 B2* | 4/2018 | Maurer | B23Q 1/76 |
| 9,981,831 B2* | 5/2018 | Terzuolo | B66C 3/14 |
| 10,239,169 B2* | 3/2019 | Maurer | B23Q 1/76 |
| 10,730,732 B1* | 8/2020 | Lasslo | B66F 19/00 |
| 11,027,381 B2* | 6/2021 | Onushko | B23Q 3/064 |
| 11,110,551 B1* | 9/2021 | Song | C21D 9/08 |
| 11,185,952 B2 | 11/2021 | Takata et al. | |
| 11,446,775 B2 | 9/2022 | Schahuber | |
| 11,577,348 B2 | 2/2023 | Schahuber | |
| 2002/0005399 A1* | 1/2002 | Kodama | B23K 37/0533 219/535 |
| 2002/0153406 A1* | 10/2002 | Vermaat | B23K 37/0533 228/212 |
| 2003/0205560 A1* | 11/2003 | Desloge | B23K 9/167 219/125.11 |
| 2004/0163512 A1* | 8/2004 | Quigley | B26D 3/161 83/54 |
| 2004/0237734 A1* | 12/2004 | Lessway | B23Q 11/0032 82/163 |
| 2005/0022353 A1* | 2/2005 | Viola | B23C 3/122 29/412 |
| 2008/0139092 A1* | 6/2008 | Lessway | B23Q 1/76 29/592 |
| 2009/0108606 A1 | 4/2009 | Noonan et al. | |
| 2009/0212024 A1* | 8/2009 | Muller | B23K 37/0531 219/61 |
| 2009/0297325 A1* | 12/2009 | Daraie | A01D 87/127 414/800 |
| 2010/0095729 A1* | 4/2010 | Schrunk | B23K 37/0435 72/252.5 |
| 2010/0230470 A1 | 9/2010 | Kuchuk-Yatsenko et al. | |
| 2011/0062126 A1* | 3/2011 | Lier | B23K 10/00 30/96 |
| 2011/0109030 A1* | 5/2011 | Flaig | B23K 37/0538 219/60 A |
| 2011/0186556 A1 | 8/2011 | Heinrich et al. | |
| 2012/0003072 A1* | 1/2012 | Laurini | B66C 1/427 414/746.7 |
| 2012/0213937 A1* | 8/2012 | LaValley | B23K 37/0533 29/283 |
| 2012/0279949 A1* | 11/2012 | Simmons | B23K 37/0538 219/159 |
| 2012/0298725 A1* | 11/2012 | Biggs | B23Q 3/08 228/2.1 |
| 2013/0212852 A1* | 8/2013 | Dagenais | B23K 37/0276 29/281.1 |
| 2014/0042210 A1* | 2/2014 | Schrunk | B23K 37/00 228/17.5 |
| 2014/0334903 A1* | 11/2014 | Noe | F16M 11/2028 414/433 |
| 2015/0090082 A1* | 4/2015 | Conrad | B26D 3/16 82/113 |
| 2015/0122092 A1* | 5/2015 | Tsai | B23Q 1/76 82/170 |
| 2015/0174661 A1* | 6/2015 | Brandstrom | B23K 37/0276 228/9 |
| 2015/0328714 A1* | 11/2015 | Larsson | B23K 37/04 228/112.1 |
| 2016/0016267 A1* | 1/2016 | Beatty | B23K 37/0452 29/559 |
| 2018/0001422 A1* | 1/2018 | Rajagopalan | B23K 26/282 |
| 2018/0141169 A1* | 5/2018 | Collins, Jr. | F16M 11/26 |
| 2018/0243850 A1 | 8/2018 | Schmidt et al. | |
| 2019/0143462 A1* | 5/2019 | Simmons | B23K 31/02 269/153 |
| 2019/0202011 A1* | 7/2019 | Watkins | B23K 37/047 |
| 2019/0329335 A1* | 10/2019 | Xu | B26D 7/2635 |
| 2019/0388999 A1* | 12/2019 | Blados | B23K 9/0956 |
| 2020/0016700 A1* | 1/2020 | Schahuber | B23K 37/0282 |
| 2020/0018431 A1* | 1/2020 | Takata | B23K 37/0538 |
| 2021/0062971 A1 | 3/2021 | Clark et al. | |
| 2021/0129946 A1* | 5/2021 | Poichot | F16L 23/003 |
| 2021/0172268 A1* | 6/2021 | Westgarth | F16L 1/09 |
| 2021/0379707 A1* | 12/2021 | Schahuber | B23K 37/0538 |

OTHER PUBLICATIONS

"Corrected Notice of Allowability Received for U.S. Appl. No. 17/407,490, mailed on Jun. 16, 2022."

"Corrected Notice of Allowability Received for U.S. Appl. No. 17/407,490, mailed on May 18, 2022."

"Non-Final Office Action Received for U.S. Appl. No. 16/275,922, mailed on May 18, 2022."

"Non-Final Office Action Received for U.S. Appl. No. 17/407,490, mailed on Dec. 13, 2021."

"Notice of Allowance received for U.S. Appl. No. 17/407,490, Mailed on Apr. 27, 2022."

"Notice of Allowance received for U.S. Appl. No. 16/275,922, Mailed on Oct. 11, 2022."

"Restriction Requirement Received for U.S. Appl. No. 16/275,922, mailed on Mar. 18, 2022."

* cited by examiner

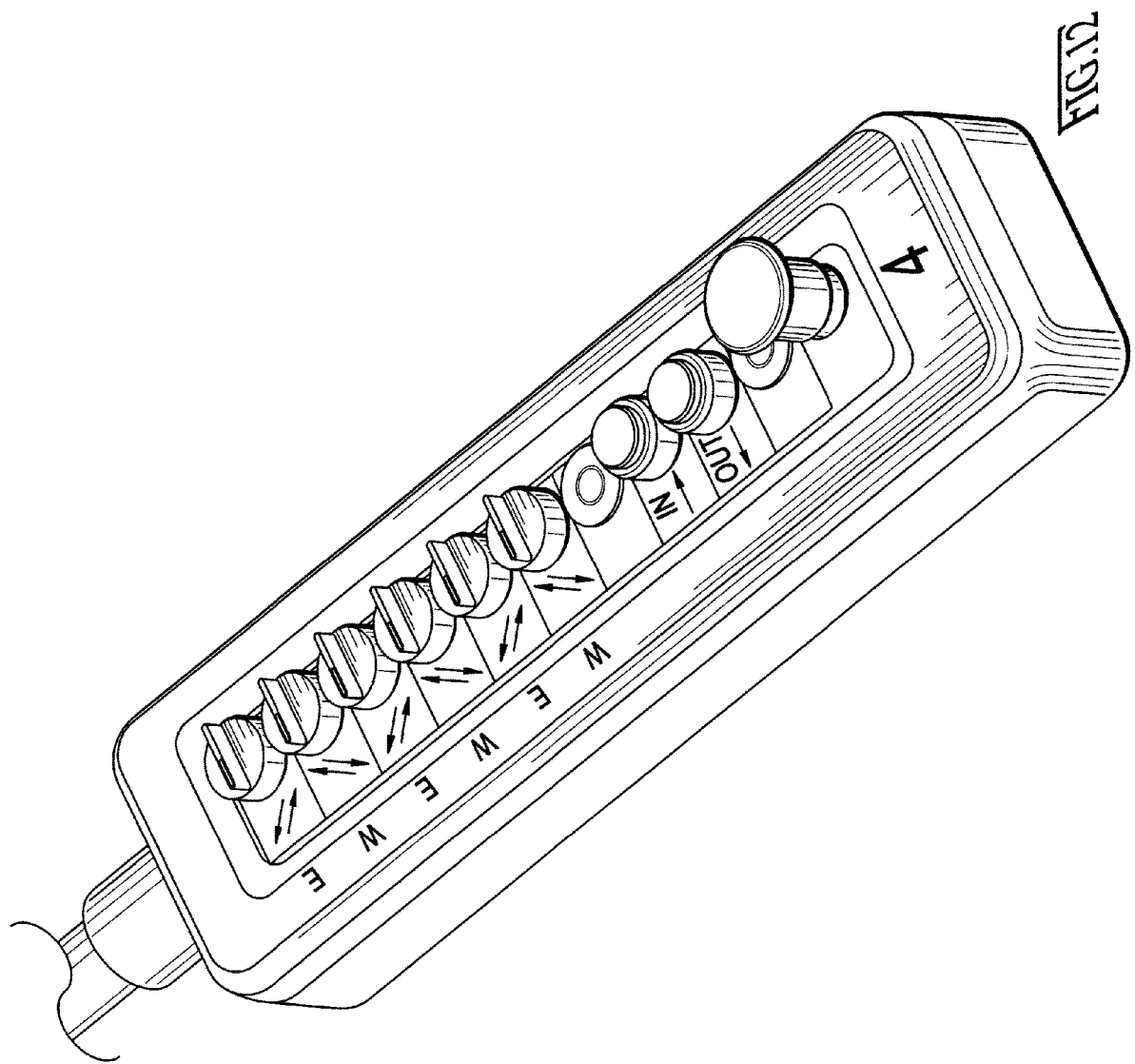

TANK FABRICATING EQUIPMENT

CROSS-REFERENCE TO RELATED APPLICATIONS

This application is a continuation of and claims the benefit of U.S. patent application Ser. No. 16/275,922 filed on Feb. 14, 2019, which claims the benefit of U.S. Provisional Patent Application Ser. No. 62/698,627 filed Jul. 16, 2018, the disclosures of which are incorporated herein by reference.

BACKGROUND

Field of the Invention

This disclosure is in the field of equipment used in the fabrication of tanks. More specifically, this disclosure is in the field of equipment used to align and hold the component parts of a tank during assembly.

SUMMARY OF THE INVENTION

In various embodiments, the tank fabricating equipment comprises at least one frame supporting a series of extending arms to support and align a tank shell during tank fabrication. The frames may be mounted on wheels, rails, or other mobile platform to allow them to move in relation to other frames or other equipment used with the frames.

As the arms extend and contact a partially constructed tank shell, they conform the tank shell into a desired circular cross-sectional shape prior to welding. In various embodiments of the equipment, it is provided with at least one set of arms on each side of the tank shell. The arms are provided with rollers in contact with the tank shell to hold the tank shell in the desired position.

In some embodiments the rollers are specially designed to overlap a seam between the tank shell and an adjacent tank component, such as another tank shell or a tank head. In such embodiments, the overlapping roller results in improved alignment between the adjacent components.

BRIEF DESCRIPTION OF THE DRAWINGS

FIG. 12 is a detail view of a portion of the control system of an embodiment of the tank fabricating system.

DETAILED DESCRIPTION

Figure 1:
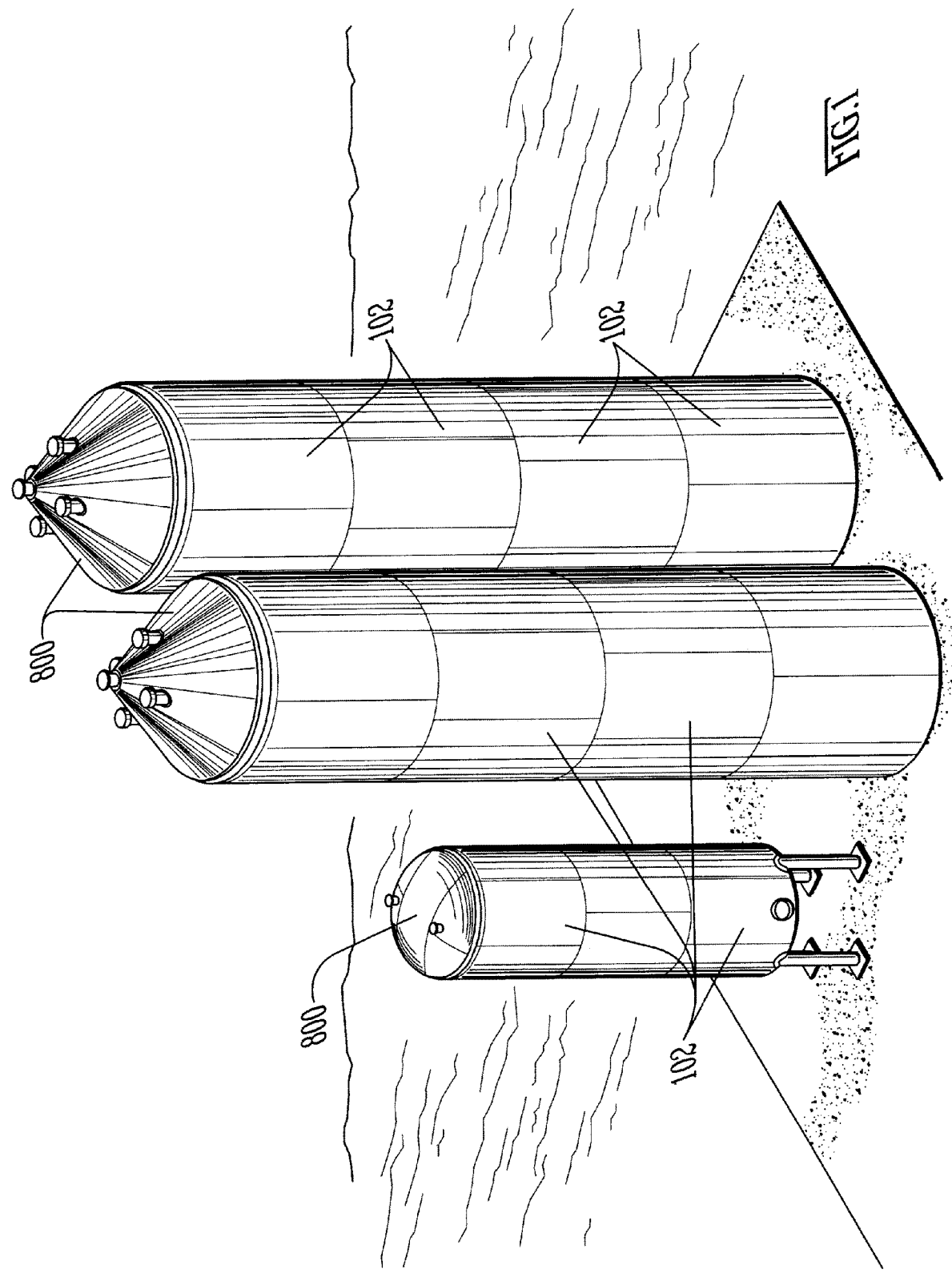
FIG. 1 is a perspective view of examples of the types of tanks that may be fabricated using the tank fabricating equipment.

The tank fabricating equipment and system comprises equipment for aligning and holding the component parts of a tank together during the fabrication process so that they can be joined to form the tank. Although this system is capable of use on smaller tanks, it is also capable of being used to fabricate large tanks, such as large stainless steel tanks used in various types of industrial processing facilities. The tanks typically consist of cylinders, sometimes referred to as tank shells, formed from sheets of stainless steel with two opposing edges welded together. After the completion of the tank, the tank shells have substantially circular cross-sections. In some cases the tanks have end caps that are flat circles, conical, or roughly hemispherical in shape, and in other cases one or more ends of the tanks may be open and held in shape by a flange or other structural component. FIG. 1 depicts several examples of the finished tanks comprised of multiple tank shells 102 and head and end pieces 800. A tank as referred to herein need not be sealed on one or either end, but may comprise one or more tank shells that have flanges on one or both ends for attachment to other components, or even have raw edges on either end. Similarly, the resulting output from the tank fabricating and processing equipment may require further processing using other equipment before it is a completed product.

Figure 2:
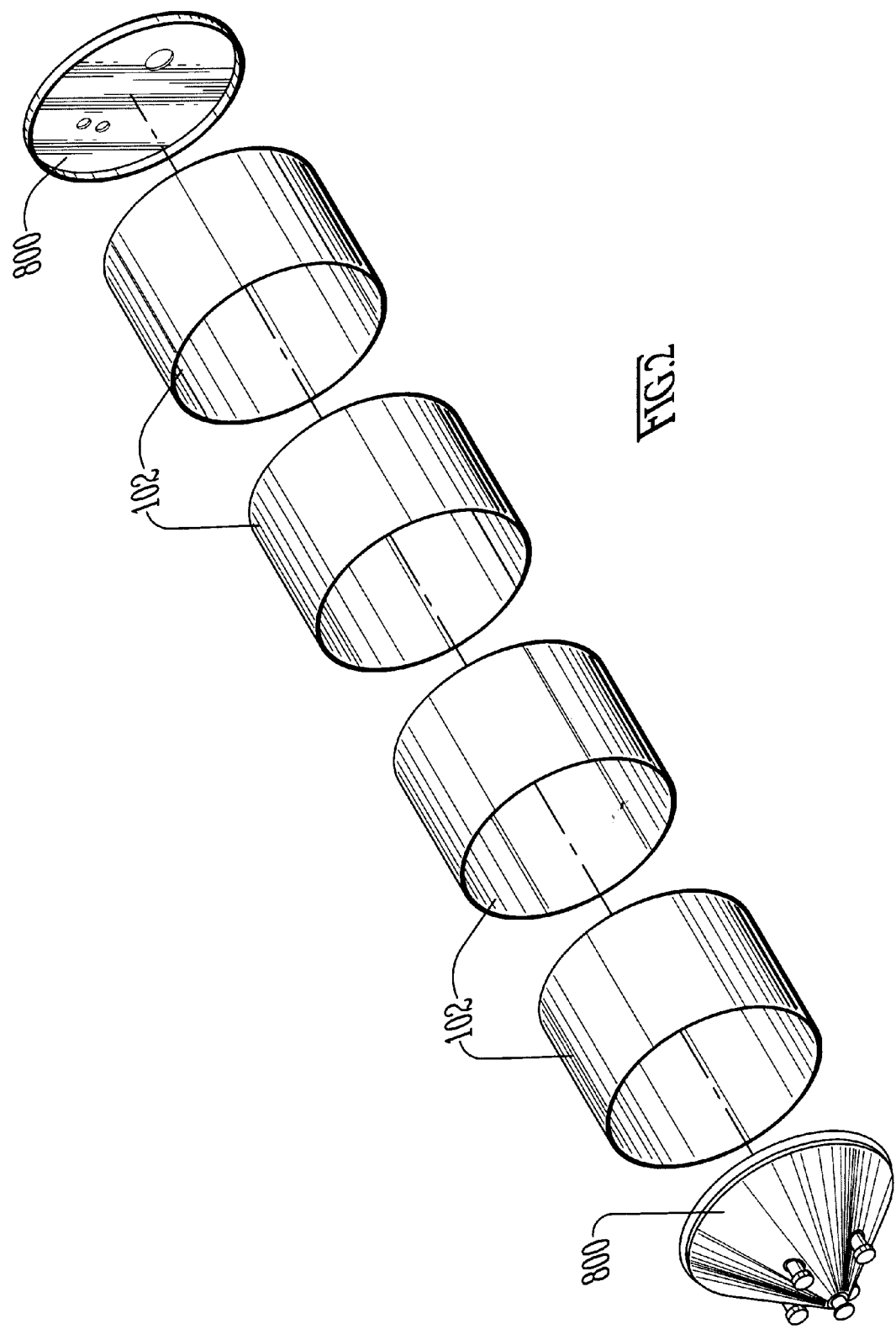
FIG. 2 is an exploded view of an example of the type of tank that may be fabricated using the tank fabricating equipment.

The tanks are typically constructed of a sheet product such as sheet metals of various types, including stainless steel. The tank shell is typically formed from sheets of the product that are formed into a roughly cylindrical shape by bringing two opposing edges together, and then welded or otherwise secured together along those edges. Then two circular or roughly hemispherical head pieces are attached via welding or otherwise to the open ends of the cylinder formed by the tank shell to complete the tank body. An example tank is shown in an exploded view in FIG. 2, with four adjacent tank shells 102 and head and end pieces 800.

The tank shell is typically formed, and joined with other tank shells and components, with the lengthwise axis of the cylindrical tank formed parallel to the surface of the ground. Since the sheet product used to form the tank shell is flexible enough to be formed into a circle, the tank shell often flexes under the force of gravity, or other forces to which it is subjected, to form an oval cross-section instead of the desired circular cross-section. This over flexing makes it difficult to align and attach the head pieces to the tank shell, and can lead to reduced efficiency, increased fabrication times, and lower overall quality of the final product. The tank shells are prone to flexing out of a circular cross-section until the head pieces, flanges, or other structural components are attached to the shell to provide it with the necessary rigidity.

The tank fabrication system described herein provides support to the tank shell during fabrication to maintain it in the desired shape with a circular cross-section. This makes it easier and faster to fabricate tanks with the desired shape and quality of workmanship. The tank fabricating equipment applies forces to one or more tank shells to cause the shell to adopt a circular cross-section. The tank fabricating equipment also aligns the edges of two adjacent shells while holding them in a circular cross-section and rotates them to provide quick, easy, and accurate welding of the seams, both initial manual tack welding, as well as final computer controlled welding operations.

The tank fabricating system consists of multiple pneumatically or hydraulically actuated roller that are designed to "hug" a tank shell and hold it in the desired cylindrical shape with the circular cross-section while forming a circumferential seam, such as a shell-to-shell circumferential seam or a tank shell-to-head circumferential seam. The rollers not only support the tank shell from beneath but also provide support to the shell from above to keep it in the desired circular shape. Since the wall of the tank may adopt an oval cross-section due to the force of gravity on the flexible material of the tank shell, the rollers contacting the tank shell above the horizontal center line of the tank shell force the tank shell to maintain a circular cross-section while the seams are joined, and the head pieces of the tank are secured in place. The tank fabricating equipment may be used in the construction of tanks and similar vessels from very small diameter to very large diameter. The rollers may be mounted on the frame using commonly known methods of mounting rollers such as bearings or bushings to allow them to rotate with little frictional resistance.

The rollers used in this system are designed to overlap two adjacent tank shells and to hold them in the same circular shape and with their edges adjacent. The rollers then allow the two tank shells to be rotated simultaneously and in concert so that an operator may stand in one spot and weld the seam as the tank shells are rotated by the tank fabricating system. This greatly reduces the error in the previously manual alignment process whereby a user would use manual leverage, shims and similar tools to force a short portion of the seam into alignment, tack weld it, and then manually rotate the two shells, and repeat the process of manual alignment. This manual process requires a significant amount of time, and can lead to misalignment, and is very physically demanding work for larger tanks. The tank fabricating equipment described herein corrects the potential misalignment and removes all manual force required to achieve alignment. It also causes the entire seam to be in alignment at the same time.

Figure 3:
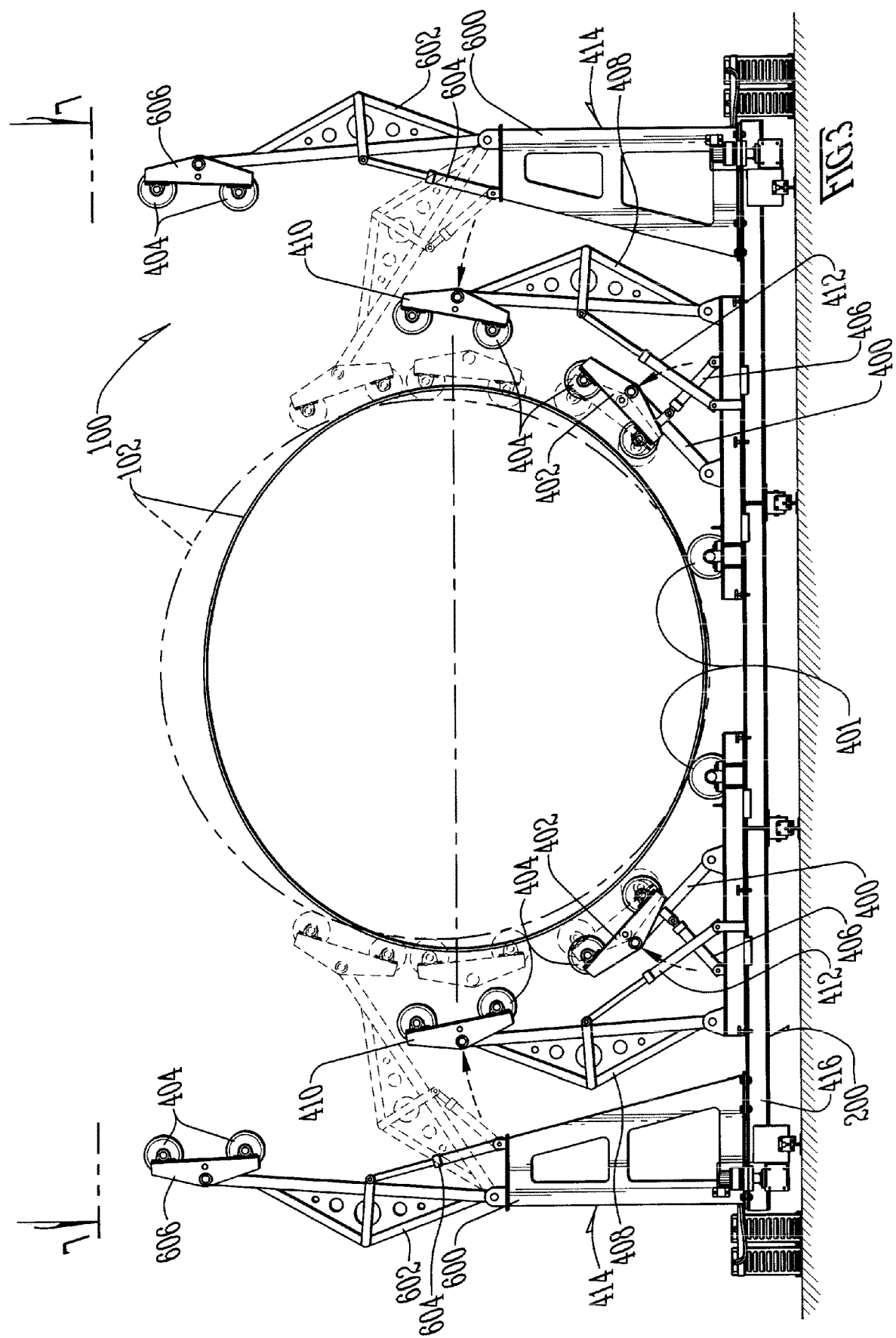
FIG. 3 is a side view of an embodiment of the tank fabricating equipment.

Referring now to FIG. 3, a side view of an embodiment of the tank fabricating equipment 100 is depicted with a tank shell 102. The solid line depiction of the tank 102 shows a non-circular cross-section tank shell that is only supported from below by the lower powered rollers 401.

In the various embodiments of the system, the arms of the tank fabricating equipment extend above the horizontal centerline of the tank shell section. The shape and outside diameters of any mating shell sections or shells to heads match exactly. As the contact wheels or rollers 404 of the tank fabricating equipment engage the shells 102, the contact rollers 404 squeeze each separate section inwardly, forcing those sections to assume and hold their intended shape. Once the rollers 404 of the tank fabricating system are brought into contact with the tank shell the force exerted by the rollers 404 forces the tank shell 102 into the circular cross-section depicted by the dashed line in FIG. 3.

Other "fit up" equipment used in the industry does not include the arms and rollers that contact the tank shell above the horizontal centerline of the tank shell. "Fit up" is a term used in the tank and vessel industry and describes the process of joining tank shells to other tank shells, or tank shells to heads. It is necessary that in order for a tank to hold its intended contents without leaking, that the heads and shells be securely and completely attached to each other to form an enclosed container.

The traditional method of fit up of shells and heads is to join them together in "non-hugging" cradles, moving each set of cradles close together and then to begin the labor-intensive process of joining them together. The process of causing the adjoining sections to fit end to end is very difficult because the tank fabricator must cause the adjoining sections to line up perfectly. There is a very small margin of error in the alignment. The tank fabricator must align the adjoining material thicknesses edge to edge. The adjoining thicknesses may be as thin as 12 gauge (0.105") thick. The tank fabricator is required by tank and vessel construction code to adjoin the edges within a tolerance of 25% of the thickness of the thinner of the two adjoining sections. In the case of 12 gauge, that means the alignment must be within 0.105"×25%=0.02625". Manually aligning and checking alignment of large tanks with this very small tolerance for error causes the joining process to be very time and labor intensive.

The tank fabricating equipment described herein eliminates the manual process of aligning the edges of the two sections together by using the contact rollers 404 of the arms to form the tank shell into the desired shape. By placing the edges of two shells onto the same set of rollers, the force exerted by the rollers automatically aligns the adjacent shells 102. As the arms apply inward pressure on the two adjoining sections simultaneously it forces the shape and alignment of the tank shells because the adjoining sections are being squeezed with a common set of contact rollers 404 at a common squeezing force. This process causes the sections to align perfectly and therefore eliminates the misalignment problems inherent in the traditional method. The 25% alignment tolerance described above is easily met by the tank fabricating system described herein.

Tank fabricators using the tank fabricating system have increased productivity dramatically. An example of the labor reduction achieved by using the tank fabricating system is for an 11' diameter tank of ⅜" plate thickness. The traditional method of fit up would have taken approximately 5.5 labor hours for each circumferential fit up. The tank fabricating system completed the same task in only 1.25 hours, comprising a 440% increase in productivity.

Referring now to FIGS. 3-7, various views of an embodiment of the tank fabricating equipment are depicted. The various components of the system 100 are supported by a frame formed from a variety of structural members 200 formed of steel or other material suitable to support the weight of the tank fabricating equipment, the tank shell, and any other equipment that may be attached to it. The structure members 200 may be mounted on wheels or rails to allow the entire system and any tank shells thereon to be translated as desired, and may be provided with drive wheels or tracks to move the system.

In this embodiment, three arms 400, 408, and 602 are provided on each side of the frame. Each arm may be formed from one or more structural components or arm members that are joined to form arm, which may comprise a truss structure or other type of structure designed to create a strong arm that is lighter than a single solid member would necessarily be to achieve the same strength. The arms and arm members may be considered as two sets, one set disposed on each side of a line denoting the "center line" of the frame for purposes of tank fabrication, though it need not be the exact center line of the frame. The dashed line shown in FIG. 7 bisecting the top view of the frame is the logical "center line" of the depicted embodiment. In the depicted embodiment, each set of three arms 400, 408, and 602 are disposed on opposite sides of the center line of the frame, and are oriented so that the arms in each set pivot toward the center line of the frame.

Each arm is pivotally attached at a first end thereof to a structural member 200 or to a structure attached to the structural members 200, such as structure 414, designed to provide for the upper arms. Each arm 400, 408, 602 are provided with actuators 406, 412, and 604, respectively. The actuators are pivotally attached to the structural member 200 at a first end of each actuator. The second end of each actuator is pivotally attached to one of the arms 400, 408, or 602, such that operation of the actuator will cause the arm to which it is attached to pivot toward or away from a tank shell disposed on the equipment. As described above, the actuators may be pneumatic, hydraulic, or any other similar actuator capable of exerting the necessary force.

Figure 4:
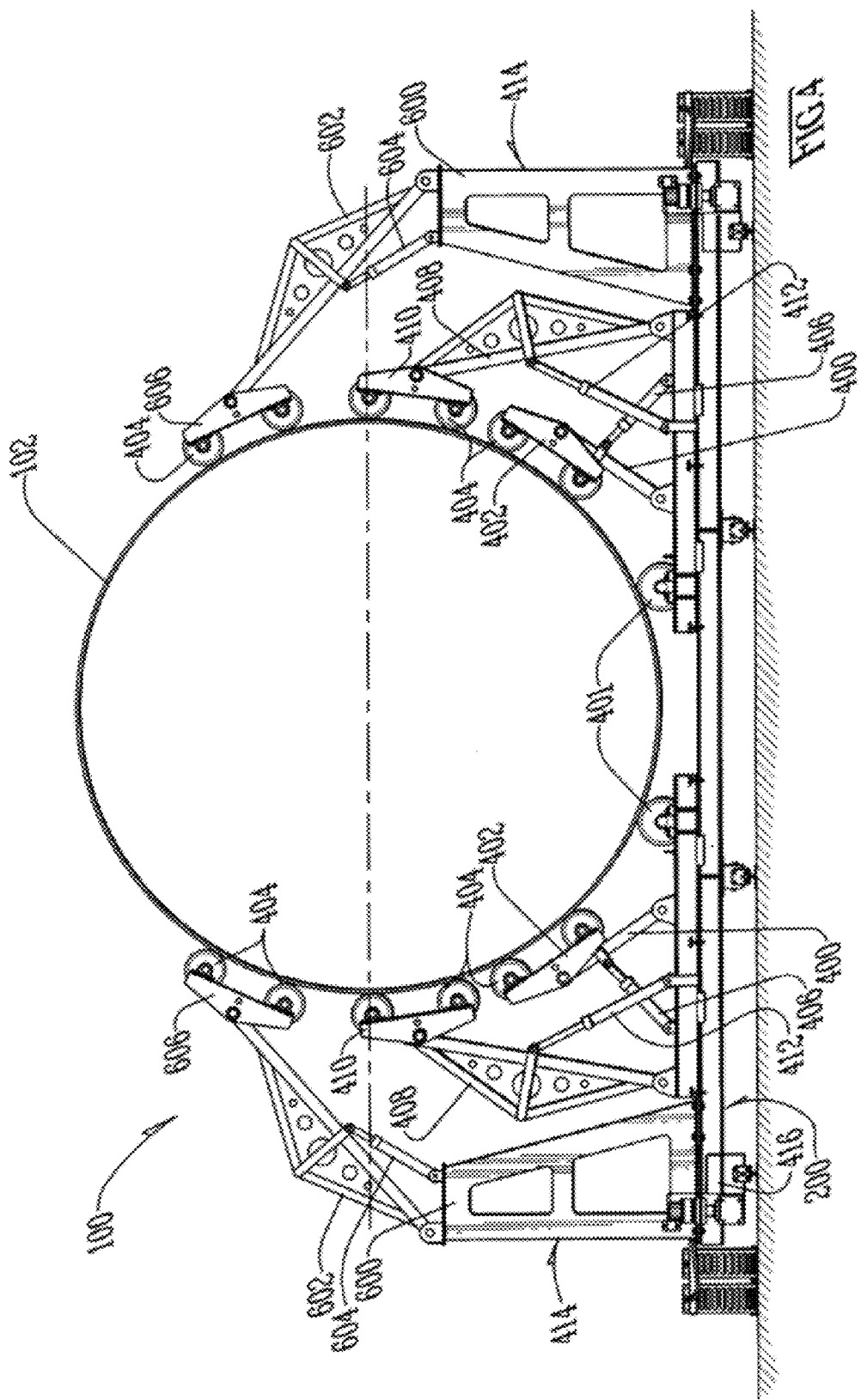
FIG. 4 is a side view of an embodiment of the tank fabricating equipment.

Roller carriages 402, 410, and 606 are attached to the second end of each arm 400, 408, and 602, respectively. The roller carriage is pivotally attached to the second end of each arm. The roller carriage may have one or more rollers 404 attached to it. In a preferred embodiment, each roller carriage has two rollers attached to it and the carriage is pivotally attached to the arm at a point on the carriage substantially between the two rollers as depicted in the figures. When the arms are pivoted toward the center line of the frame, until the rollers come in contact with a tank shell disposed on the equipment, the tank shell is forced into the circular cross-sectional shape by the rollers. As can be seen in FIG. 4, at least one roller from each set of arms contacts the tank shell above a horizontal plane that bisects the cross-section of the tank shell. In some embodiments, such as that depicted in the figures, multiple rollers 404 will contact the tank shell above the referenced horizontal plane. The force on the tank shell from above this horizontal plane is necessary to force the tank shell into the desired circular cross-section.

Figure 5:
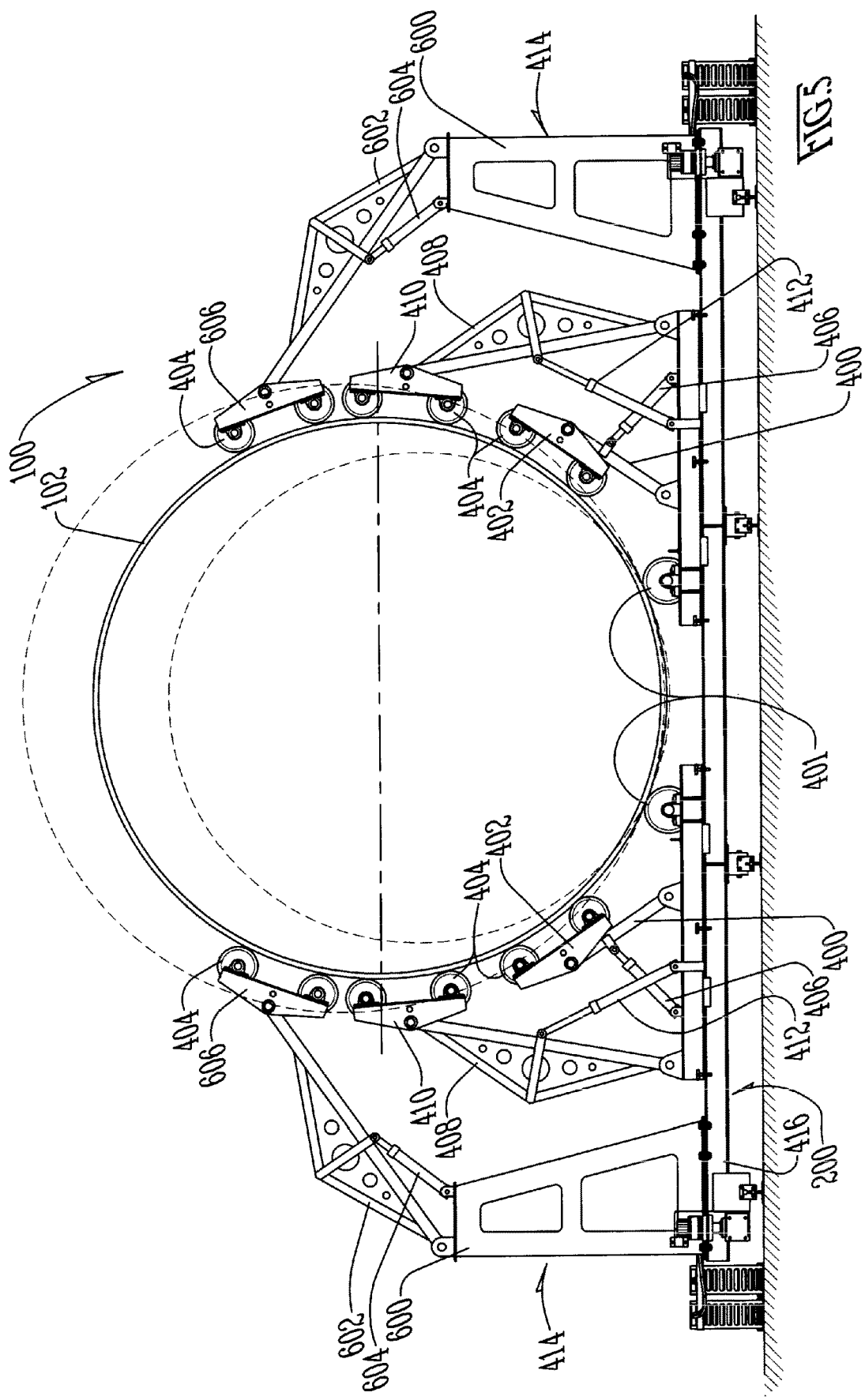
FIG. 5 is a side view of an embodiment of the tank fabricating equipment.

FIG. 5 is a side view of an embodiment of the tank fabricating equipment being used to fabricate multiple tank sizes shown by the solid and dashed lines. As can be seen in this figure, the same embodiment of the tank fabricating system 100 may be used to fabricate various sizes of tanks. As the tank size increases it may become necessary to add additional arms or to extend the arms with additional actuators and rollers. Other configurations for the arm, actuators, and rollers may be utilized as desired within the scope of the invention. In other embodiments of the tank fabricating system, the number and relationship of the various arms and rollers may be different then the embodiment depicted in the figures as necessary to handle varying sizes of tanks.

Figure 6:
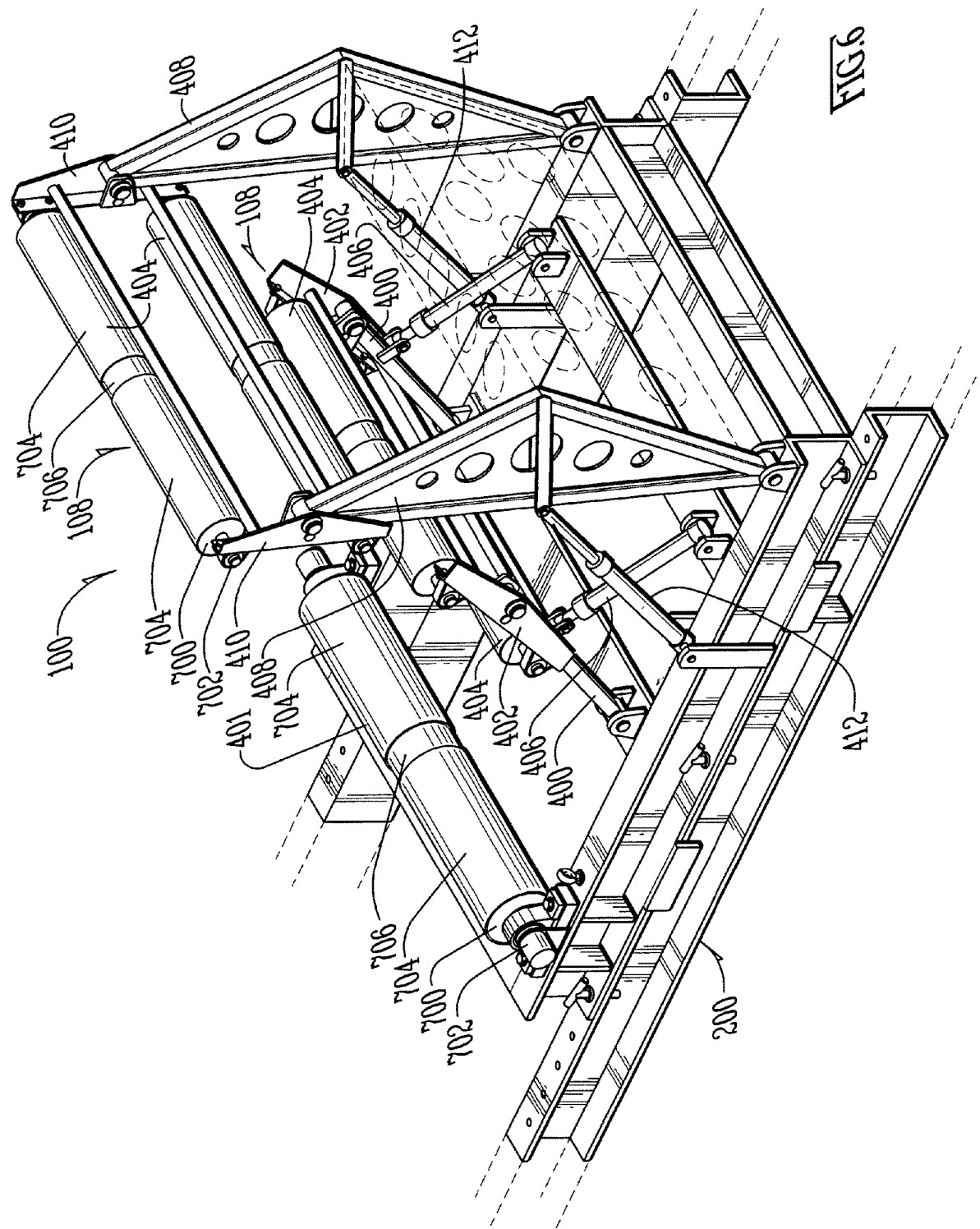
FIG. 6 is a perspective view of a portion of an embodiment of the tank fabricating equipment.

Referring now to FIG. 6, a partial perspective view of an embodiment of the tank fabricating system is depicted. FIG. 6 provides a detailed depiction of the frame and structure used to support the arms 400 and 408, and the actuators 406 and 412 attached thereto. In some embodiments of the tank fabricating system, specific rollers shown in FIG. 6 are used to provide improved performance of the equipment. In such embodiments, some or all of the rollers 401 and 404 comprise a single drum roller 700 supported by a shaft 702 that is preferable a single shaft. In some embodiments, a circumferential channel 706 is provided in the outer surface of the cylindrical drum.

In some embodiments, two sections of coating material 704 are provided on the outer surface of the roller 700. In some embodiments the coating material is urethane or other similar material. In these embodiments the channel or gap 706 may partially or completely be formed by the gap between the coating areas 704 which may expose the drum 700 or consist of a thinner layer of the coating. The drum 700 is a single drum to insure that the entire surface of the drum 700 is at the same level or circumference. Similarly the coatings 704 are applied and machined or processed to ensure that they are of the same outer circumference.

Figure 7:
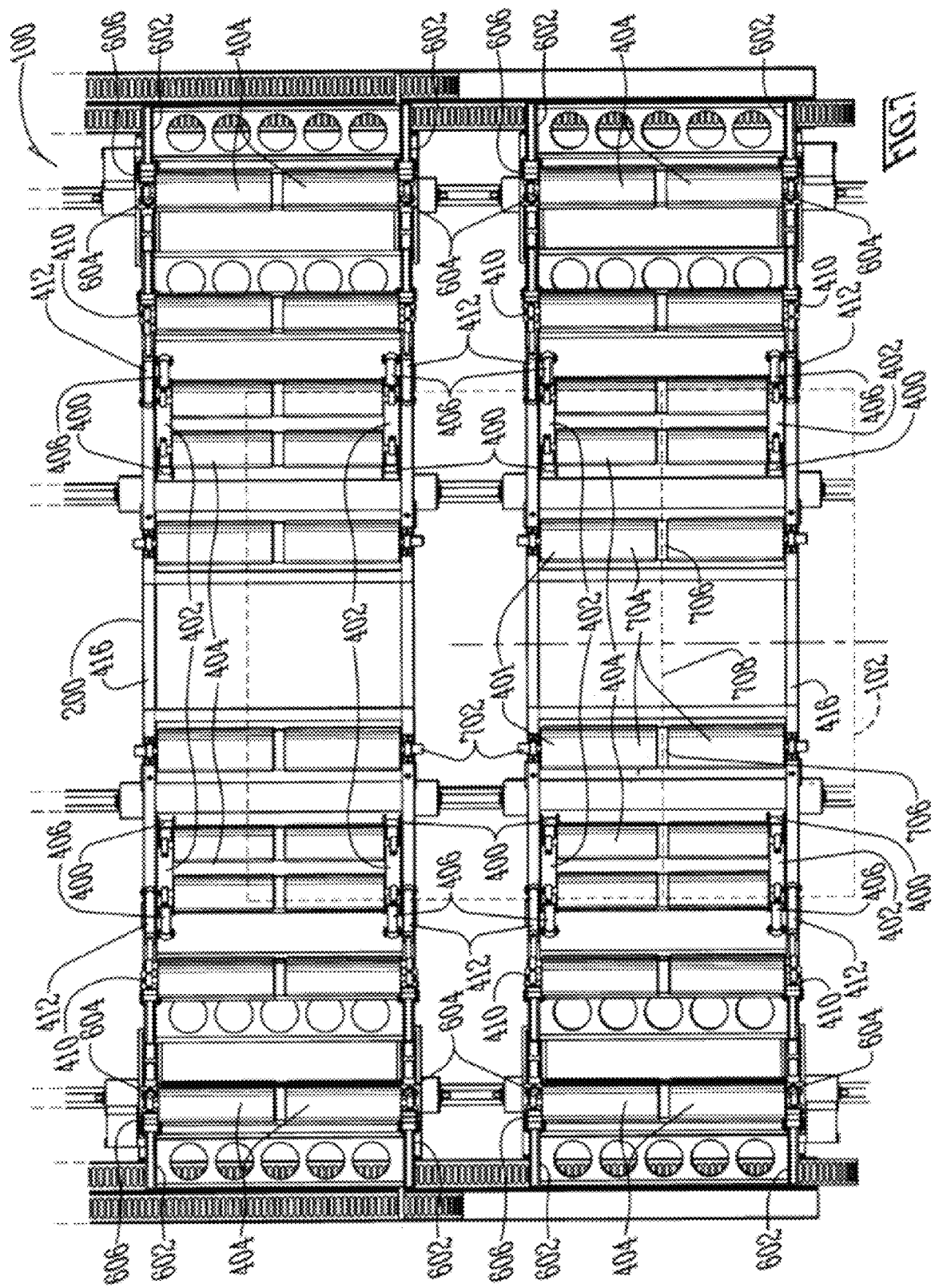
FIG. 7 is a top plan view of an embodiment of the tank fabricating system.

When these rollers are used on an embodiment of the tank fabricating system, the channels 706 of all the rollers are aligned as seen in FIG. 7. When the edges of two tank shells 102 are to be joined together, they are placed on the rollers with the edges meeting in a butt joint 708 above channels 706 of the rollers. The single drum 700 and similar coating thickness 704 causes the two adjacent shells to be aligned within the desired tolerance. The channels 706 allow the weld to pass over the rollers without damaging the roller surface or altering the alignment of the two tank shells.

Figure 8:
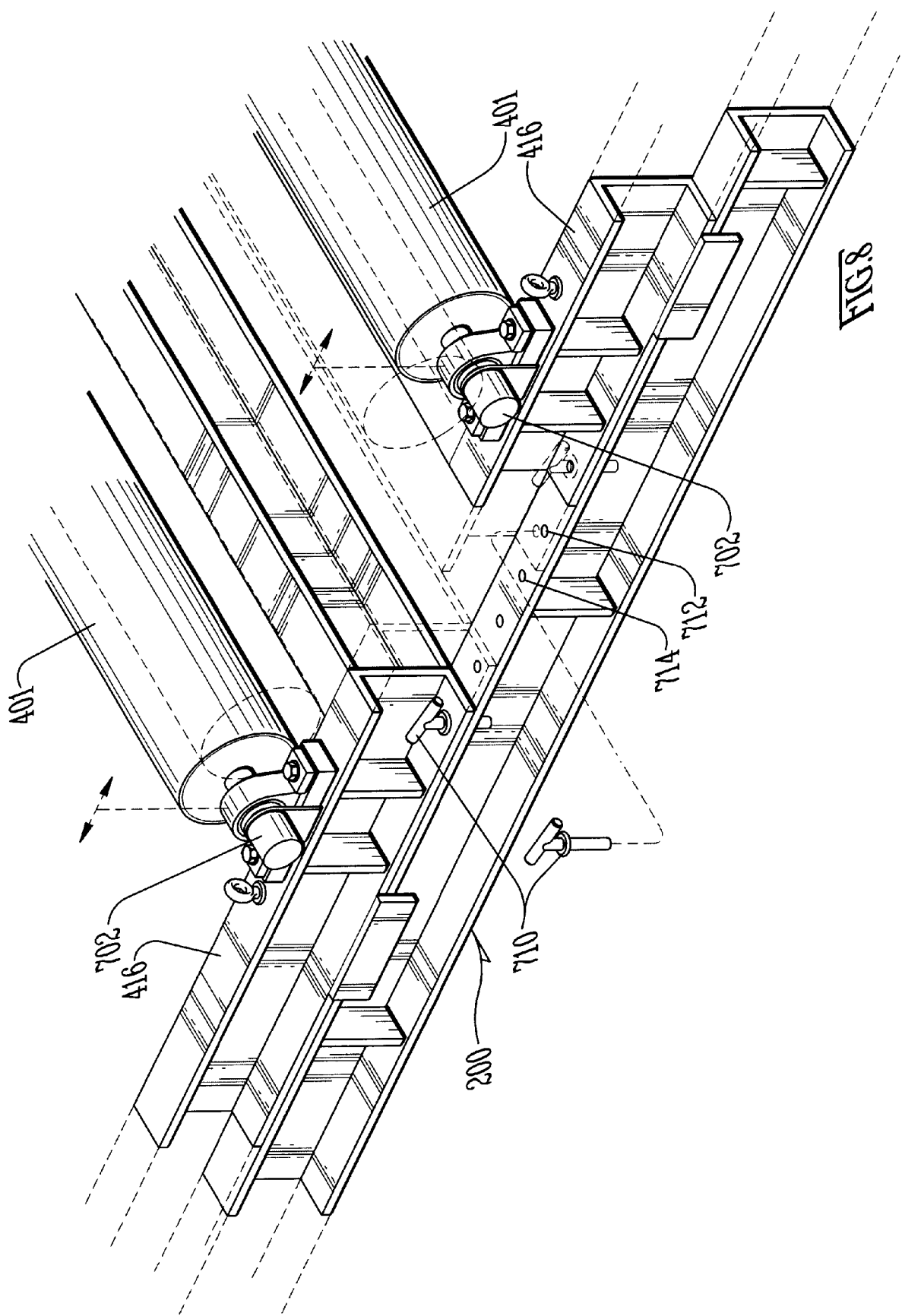
FIG. 8 is a detail view of a portion of an embodiment of the tank fabricating system.

Referring now to FIG. 8, a detailed perspective view of a portion of an embodiment of the tank fabricating equipment is depicted. In this embodiment, the two opposing sets of rollers and arms may be moved closer together or farther apart as necessary to accommodate varying sizes of tank shells. The frames 416 to which the rollers and arms are attached may be translated on structural members 200. The frames 416 are provided with a hole 712 for receiving a pin 710. At various desired distances, holes 714 are provided in structural member 200. By aligning holes 712 and 714, and inserting pin 710 therein, the relative dimensions of the two frames may be adjusted as desired.

Figure 9:
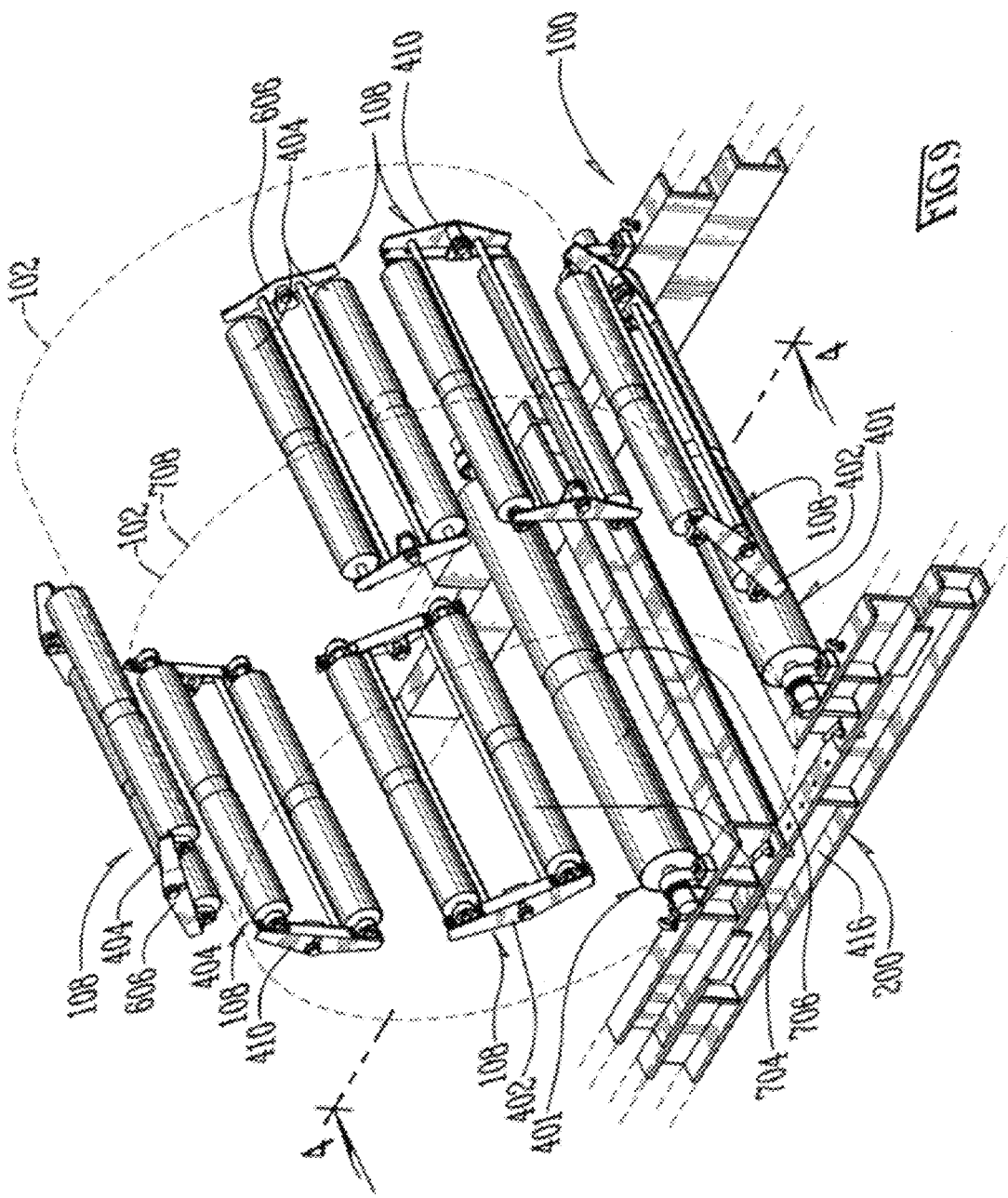
FIG. 9 is a perspective view of the rollers of an embodiment of the tank fabricating system depicting the configuration used to join two segments of tank shell.
Figure 10:
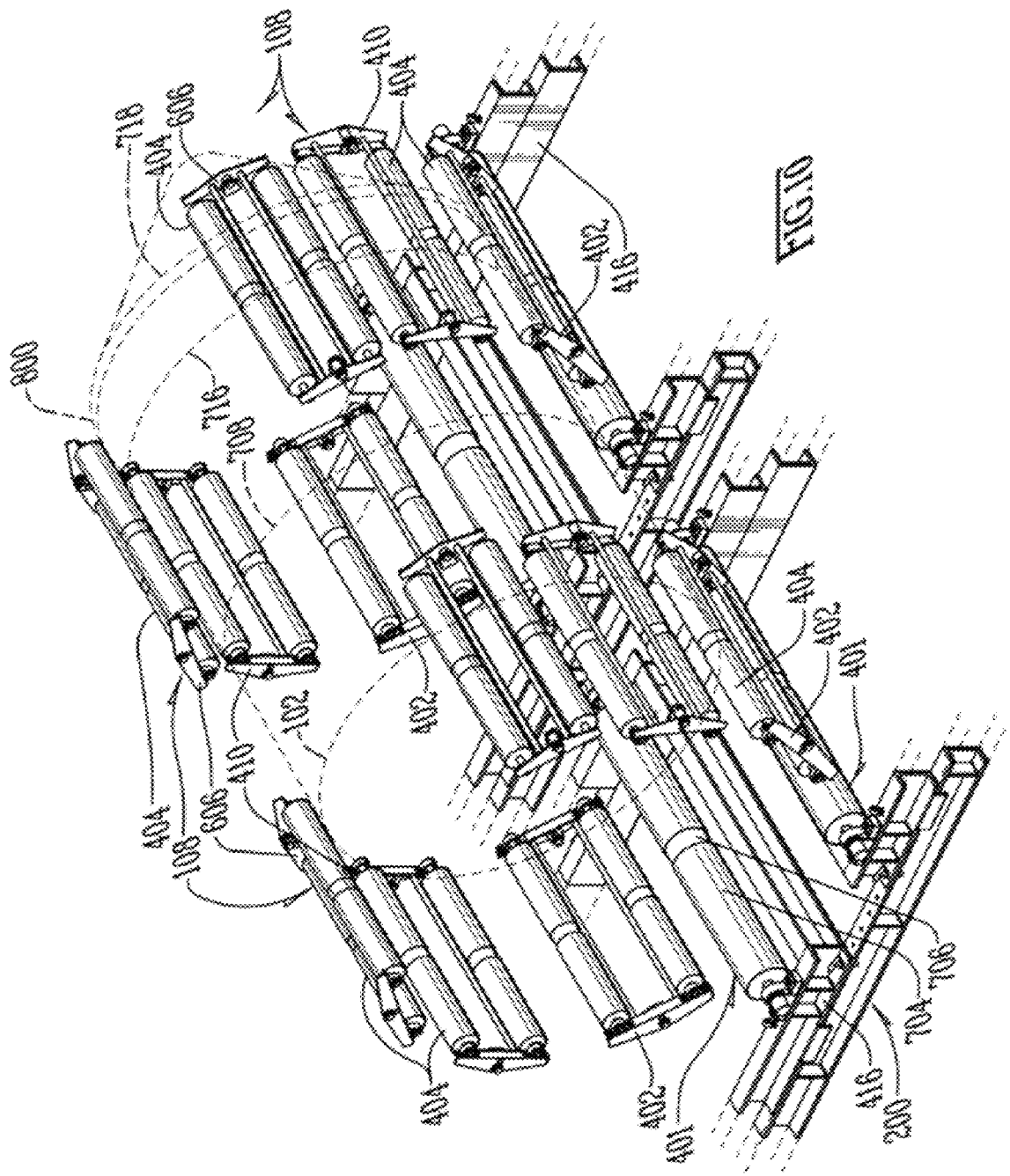
FIG. 10 is a perspective view of the rollers of an embodiment of the tank fabricating system depicting the configuration used to join additional tank components to a tank shell.

Referring now to FIGS. 9 and 10, embodiments of the tank fabricating equipment are shown to illustrate the process of joining two or more tank shells together. In FIG. 9, the tank fabricating system 100 is shown with two tank shells 102 disposed thereon. The two shells 102 meet at butt joint 708 which is aligned with the gaps 706 in coating areas 704. The two shells are supported by contact with the coating areas 704 so that a gap is provided between the outer surface of the drum 700 and the tank shells 102 in gap 706.

The arms (not shown in FIGS. 9 and 10) are pivoted toward the tank shells 102 until rollers 404 contact the outer surface of the tank shells 102 on either side of the butt joint 708. The actuators increase the force on the arms until the rollers apply sufficient force to the tank shells to conform them to the desired circular cross-section. A separate lateral force may be applied to the tank shells 102 that is perpendicular to the butt joint 708 to cause the joint to be forced together. In some cases, this lateral force is applied by using a "come-along" or similar device to pull the outer edges of each tank shell 102 toward the butt joint 708 thus pushing the butt joint together.

Once the tank shells 102 are aligned and pulled tightly together, the drive rollers 401 may be rotated using a motor in a first direction to cause both of the tank shells to simultaneously rotate in the opposite direction. The rotation may be continuous or periodic as desired by the operator of the equipment. As the tank shells rotate, a welder may stand on the outside of the equipment between the arms and tack weld the butt joint 708 with or without stopping the rotation of the tank shells 102.

Once the butt joint 708 is tack welded, a finish welder may be inserted over one of the tank shells to position a welding head at the butt joint 708, for example in the area of the butt joint above and between the highest rollers 404. In some embodiments of the system, the finish welder head is computer controlled, and the drive rollers are under simultaneous computer control by the same system so that the welding system operates to rotate the shells 102 past the finish welding head during the final weld operation.

Referring now to FIG. 10, additional pieces of tank fabricating equipment may be used together to support tank shells 102 as more components are added to the tank. These additional components may be additional tank shells 102 that are joined at butt joint 716, or caps or flange 718. When the component is a flange or similar component the joint 718 may be formed to the side of the tank fabricating equipment 100 with the edge of the tank shell 102 that is to be joined to the flange extending out to the side. The flange or other component may be clamped onto the shell and then the drive rollers used to rotate the combination for welding as described above.

Figure 11:
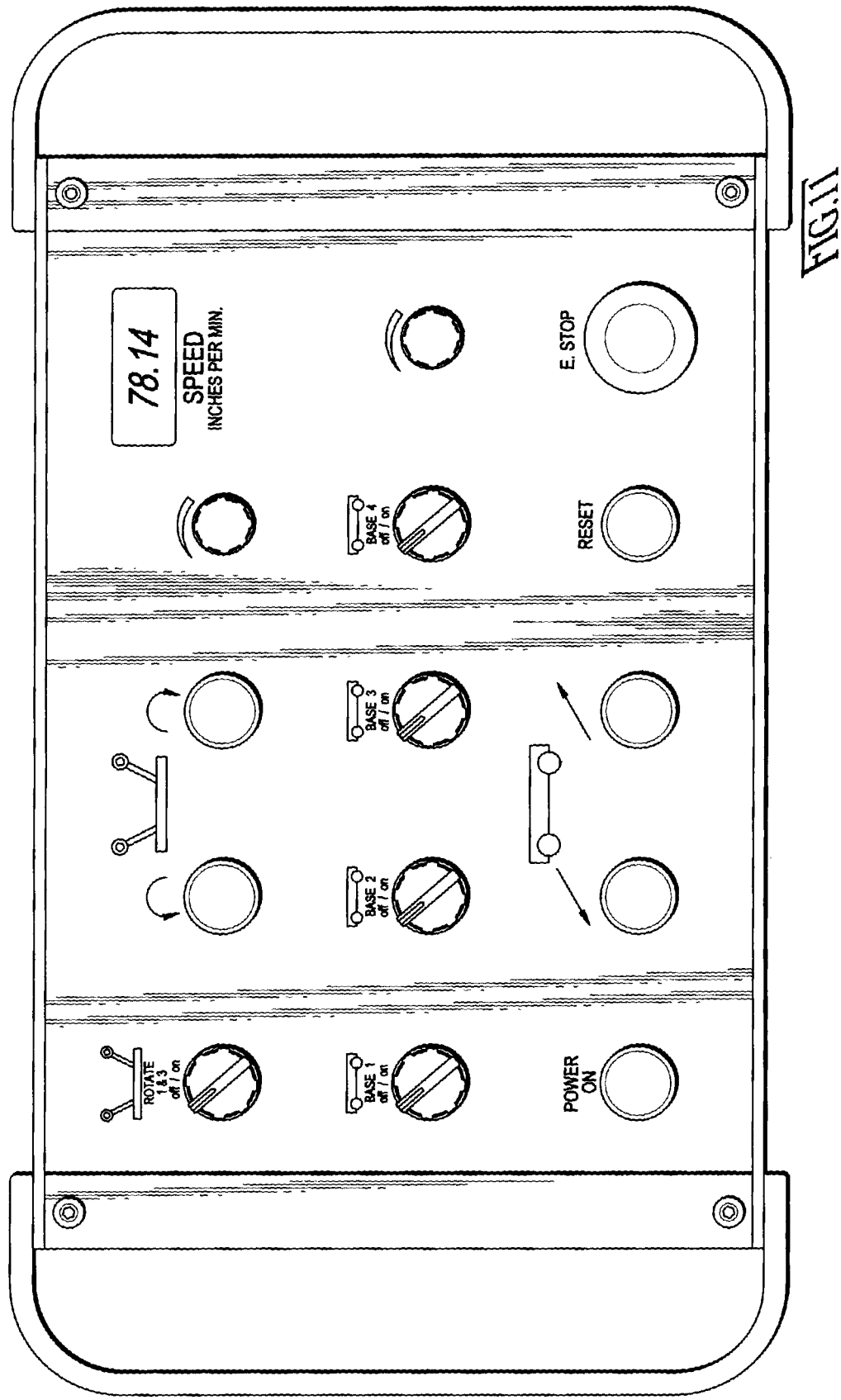
FIG. 11 is a detail view of a control panel of an embodiment of the tank fabricating system.

FIG. 11 is a view of a control panel of an embodiment of the tank fabricating system. The control panel provides an operator with the controls necessary to operate the various components of the system, and includes emergency stop and other safety features. It may provide controls to cause the drive rollers 401 to rotate in one or more direction, as well as controls to cause the arms to pivot toward or away from the tank shells 102. The control unit may also provide controls for the speed of arm or roller movement, as well as gauges or other displays showing the settings and status of the equipment. Some embodiments may also provide controls to translate the equipment on rails or by other means. A single control unit may provide controls for multiple units of the tank fabricating equipment.

FIG. 12 is a detail view of a portion of the control system of an embodiment of the tank fabricating system. This embodiment is a handheld device for controlling the equipment and its various functions. Actuators may be provided for controlling each set of arms individually or simultaneously. Drive roller actuators may also be provided, in addition to an emergency stop actuator.

"Substantially" means to be more-or-less conforming to the particular dimension, range, shape, concept, or other aspect modified by the term, such that a feature or component need not conform exactly. For example, a "substantially cylindrical" object means that the object resembles a cylinder but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

In other embodiments of the equipment and system, computer control via a general purpose or specific purpose computer may be utilized. In such embodiments, a user interface may be provided for a user to input controls or program the operation of the equipment. In such embodiments, the computer control system may simultaneously control other related equipment such as welding systems to coordinate the operation of the various pieces of equipment. For example, a computer welding control system may also control the rotation of the drive rollers 401 to automate the final welding of a butt joint between two tank shells. The details of implementing a control system for the disclosed system will be apparent to one of skill in the art of controlling pneumatic or hydraulic systems, or for providing computer control of such systems.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for processing a portion of tank from at least two tank components, at least one of which is a tank shell, the system comprising:
   a frame comprising at least one structural member, the frame having a center line;
   a drive roller mounted on the frame;
   a first arm member and a second arm member, the first arm member disposed on the opposite side of the center line of the frame from the second arm member;
   a third arm member and a fourth arm member, the third arm member disposed on the opposite side of the center line of the frame from the fourth arm member;
   a fifth arm member and a sixth arm member, the fifth arm member disposed on the opposite side of the center line of the frame from the sixth arm member;
   wherein each of said first, second, third, fourth, fifth, and sixth arm members mount two or more arm rollers;
   wherein a first end of each of said first, second, third, fourth, fifth, and sixth arm members is pivotally mounted onto the frame such that each of said first, second, third, fourth, fifth, and sixth arm members may be selectively pivoted toward and away from the center line of the frame to selectively cause their respective mounted one or more arm rollers to come in contact with or no longer contact, respectively, a tank shell disposed on the drive roller; and
   wherein said first arm member is configured to bring each of said one or more arm rollers mounted from said first arm member in contact with the tank shell above a horizontal plane that bisects the tank shell and said second arm member is configured to bring each of said one or more arm rollers mounted from said second arm member in contact with the tank shell above the horizontal plane that bisects the tank shell.

2. The system of claim 1, wherein:
   said fifth arm member is configured to bring said one or more arm rollers mounted on said fifth arm member in contact with the tank shell below the horizontal plane that bisects the tank shell and said sixth arm member is configured to bring said one or more arm rollers mounted on said sixth arm member in contact with the tank shell below the horizontal plane that bisects the tank shell.

3. The system of claim 1, wherein the system is configured to apply pressure to the tank shell sufficient to conform the tank shell to assume approximately a circular cross-sectional shape.

4. The system of claim 1, wherein:
   each of said first, second, third, fourth, fifth, and sixth arm members mount two arm rollers via a respective roller carriage.

5. The system of claim 1, wherein:
   said frame comprises a main structural member attached to a first upright structural member and a second upright structural member, said first upright structural member attached to said main structural member on the opposite side of the center line of the frame from the second upright structural member;

said first arm member is pivotally mounted onto said first upright structural member; and said second arm member is pivotally mounted onto said second upright structural member.

6. The system of claim 5, wherein:

said first upright structural member comprises a first A-frame; and said second upright structural member comprises a second A-frame.

7. The system of claim 1, wherein:

each of said arm rollers comprises a first coating spaced apart from a second coating on an outer surface such that a circumferential channel is formed by a gap between the first coating and the second coating.

8. The system of claim 7, wherein the first coating and the second coating are machined to a common circumference.

9. The system of claim 7, wherein the circumferential channels of each of said arm rollers are aligned.

10. The system of claim 1, wherein the frame is mounted on rails to allow the system to be translated along the rails.

11. A system for processing a portion of tank from at least two tank components, at least one of which is a tank shell, the system comprising:

a frame comprising a main structural member attached to a first upright structural member, the first upright structural member comprising a first upright portion positioned in a fixed upright position perpendicular to said main structural member and a first top surface positioned parallel to said main structural member, and to a second upright structural member, the second upright structural member comprising a second upright portion positioned in a fixed upright position perpendicular to said main structural member and a second top surface positioned parallel to said main structural member; the frame having a center line; and said first upright structural member attached to said main structural member on the opposite side of the center line of the frame from the second upright structural member;

a drive roller mounted on the frame;

a first arm member and a second arm member, the first arm member disposed on the opposite side of the center line of the frame from the second arm member;

a third arm member and a fourth arm member, the third arm member disposed on the opposite side of the center line of the frame from the fourth arm member;

wherein each of said first, second, third, and fourth arm members mount one or more arm rollers;

wherein a first end of each of said first, second, third, and fourth arm members is pivotally mounted onto the frame such that each of said first, second, third, and fourth arm members may be selectively pivoted toward and away from the center line of the frame to selectively cause their respective mounted one or more arm rollers to come in contact with or no longer contact, respectively, a tank shell disposed on the drive roller;

wherein said first arm member is configured to bring said one or more arm rollers mounted on said first arm member in contact with the tank shell above a horizontal plane that bisects the tank shell and said second arm member is configured to bring said one or more arm rollers mounted on said second arm member in contact with the tank shell above the horizontal plane that bisects the tank shell;

wherein said first arm member is pivotally mounted onto said first top surface; and wherein said second arm member is pivotally mounted onto said second top surface.

12. The system of claim 11, wherein:

said first upright structural member comprises a first A-frame; and said second upright structural member comprises a second A-frame.

13. The system of claim 11, wherein:

said third arm member is configured to bring said one or more arm rollers mounted on said third arm member in contact with the tank shell below the horizontal plane that bisects the tank shell and said fourth arm member is configured to bring said one or more arm rollers mounted on said fourth arm member in contact with the tank shell below the horizontal plane that bisects the tank shell.

14. The system of claim 11, wherein the system is configured to apply pressure to the tank shell sufficient to conform the tank shell to assume approximately a circular cross-sectional shape.

15. The system of claim 11, wherein:

each of said first, second, third, and fourth arm members mount two arm rollers.

16. The system of claim 11, wherein:

each of said first, second, third, and fourth arm members mount two arm rollers via a respective roller carriage.

17. The system of claim 11, wherein:

each of said arm rollers comprises a first coating spaced apart from a second coating on an outer surface such that a circumferential channel is formed by a gap between the first coating and the second coating.

18. A system for processing a portion of tank from at least two tank components, at least one of which is a tank shell, the system comprising:

a frame comprising a main structural member attached to a first upright structural, the first upright structural member comprising a first upright portion positioned in a fixed upright position perpendicular to said main structural member and a first top surface positioned parallel to said main structural member, and to a second upright structural member, the second upright structural member comprising a second upright portion positioned in a fixed upright position perpendicular to said main structural member and a second top surface positioned parallel to said main structural member; the frame having a center line; and said first upright structural member attached to said main structural member on the opposite side of the center line of the frame from the second upright structural member;

a drive roller mounted on the frame;

a first arm member and a second arm member, the first arm member disposed on the opposite side of the center line of the frame from the second arm member;

a third arm member and a fourth arm member, the third arm member disposed on the opposite side of the center line of the frame from the fourth arm member;

a fifth arm member and a sixth arm member, the fifth arm member disposed on the opposite side of the center line of the frame from the sixth arm member;

wherein each of said first, second, third, fourth, fifth, and sixth arm members mount two arm rollers;

wherein a first end of each of said first, second, third, fourth, fifth, and sixth arm members is pivotally mounted onto the frame such that each of said first, second, third, fourth, fifth, and sixth arm members may be selectively pivoted toward and away from the center line of the frame to selectively cause their respective mounted arm rollers to come in contact with or no longer contact, respectively, a tank shell disposed on the drive roller;

wherein said first arm member is configured to bring said two arm rollers mounted on said first arm member in contact with the tank shell above a horizontal plane that bisects the tank shell and said second arm member is configured to bring said two arm rollers mounted on said second arm member in contact with the tank shell above the horizontal plane that bisects the tank shell;

wherein said first arm member is pivotally mounted onto said first top surface;

wherein said second arm member is pivotally mounted onto said second top surface; and wherein the system is configured to apply pressure to the tank shell sufficient to conform the tank shell to assume approximately a circular cross-sectional shape.

19. The system of claim 18, wherein:

said first upright structural member comprises a first A-frame; and said second upright structural member comprises a second A-frame.

* * * * *

UNITED STATES PATENT AND TRADEMARK OFFICE
CERTIFICATE OF CORRECTION

| | | |
|---|---|---|
| PATENT NO. | : 12,370,634 B2 | Page 1 of 1 |
| APPLICATION NO. | : 18/109172 | |
| DATED | : July 29, 2025 | |
| INVENTOR(S) | : Schahuber | |

It is certified that error appears in the above-identified patent and that said Letters Patent is hereby corrected as shown below:

In the Specification

In Column 1, Line 8, delete "2019," and insert -- 2019, now U.S. Pat. No. 11,577,348, --, therefor.

In Column 6, Line 2, delete "insure" and insert -- ensure --, therefor.

In Column 8, Line 8, delete "need" and insert -- need to --, therefor.

Signed and Sealed this
Ninth Day of December, 2025

John A. Squires
*Director of the United States Patent and Trademark Office*